US012722945B2

(12) United States Patent
Welschof et al.

(10) Patent No.: US 12,722,945 B2
(45) Date of Patent: Sep. 1, 2026

(54) FORESTRY WINCH

(71) Applicant: Bernward Welschof, Grossostheim (DE)

(72) Inventors: Bernward Welschof, Grossostheim (DE); Michael Willenbücher, Oberzent (DE); Claus Hofmann, Haibach (DE)

(73) Assignee: Bernward Welschof, Grossostheim (DE)

(*) Notice: Subject to any disclaimer, the term of this patent is extended or adjusted under 35 U.S.C. 154(b) by 311 days.

(21) Appl. No.: 18/029,235

(22) PCT Filed: Sep. 13, 2021

(86) PCT No.: PCT/EP2021/075054
§ 371 (c)(1),
(2) Date: Mar. 29, 2023

(87) PCT Pub. No.: WO2022/069195
PCT Pub. Date: Apr. 7, 2022

(65) Prior Publication Data

US 2024/0002199 A1 Jan. 4, 2024

(30) Foreign Application Priority Data

Sep. 30, 2020 (DE) ..................... 10 2020 125 562.4

(51) Int. Cl.

| | |
|---|---|
| ***B66D 1/00*** | (2006.01) |
| ***B66D 1/36*** | (2006.01) |
| ***B66D 1/74*** | (2006.01) |

(52) U.S. Cl.
CPC ............. *B66D 1/36* (2013.01); *B66D 1/7415* (2013.01); *B66D 1/7489* (2013.01)

(58) Field of Classification Search
CPC ...... B66D 1/36; B66D 1/7415; B66D 1/7489; B66D 1/60
See application file for complete search history.

(56) References Cited

U.S. PATENT DOCUMENTS

2013/0181177 A1* 7/2013 Moll ........................ B66D 1/30 254/338
2022/0306433 A1* 9/2022 Willenbücher ...... B66D 1/7415

FOREIGN PATENT DOCUMENTS

| | | | | | |
|---|---|---|---|---|---|
| DE | 3943593 | C2 * | 9/1993 | | B66D 1/7415 |
| DE | 202005020694 | U1 * | 7/2006 | | B66D 1/36 |
| DE | 202011051167 | U1 * | 2/2012 | | B66D 1/14 |
| ES | 2199409 | T3 * | 2/2004 | | B66D 1/72 |
| FR | 2632374 | A1 | 12/1989 | | |
| JP | 2015143153 | A * | 8/2015 | | |
| KR | 20220059802 | A * | 5/2022 | | B66D 1/60 |
| WO | 2010014048 | A1 | 2/2010 | | |
| WO | WO-2012045749 | A1 * | 4/2012 | | B66D 1/28 |

* cited by examiner

*Primary Examiner* — Kimberly S Berona
(74) *Attorney, Agent, or Firm* — The Webb Law Firm

(57) ABSTRACT

This invention relates to a forestry winch that has a rope drum driven by a drive motor and an ejector roller driven by an additional drive motor, wherein a rope runs from the rope drum to the ejector roller and is guided over the ejector roller. The rope is pressed against the ejector roller by means of a pressing device. The pressing device has at least three pressing elements which are distributed around the periphery of the ejector roller.

15 Claims, 5 Drawing Sheets

FORESTRY WINCH

CROSS-REFERENCE TO RELATED APPLICATIONS

This application is the United States national phase of International Application No. PCT/EP2021/075054 filed Sep. 13, 2021, and claims priority to German Patent Application No. 10 2020 125 562.4 filed Sep. 30, 2020, the disclosures of which are hereby incorporated by reference in their entireties.

BACKGROUND OF THE INVENTION

Field of the Invention

The invention relates to a forestry winch that has a rope drum driven by a drive motor and an ejector roller driven by an additional drive motor, wherein a rope is guided from the rope drum to the ejector roller and is guided over the ejector roller, and wherein the rope is pressed against the ejector roller by means of a pressing device.

Description of Related Art

On forestry winches of the prior art, it is known that a rope located on the rope drum is guided over a driven ejector roller. With the ejector roller driven by the drive motor, as the rope is unspooled from the rope drum and as it is taken up on the rope drum, a desired rope tension can be applied to the rope, which makes possible a safe and correct unspooling of the rope from the rope drum when the rope is being unspooled and a safe and correct take-up of the rope on the rope drum when the rope is being taken up. With the rope tension applied to the rope by the driven ejector roller, less effort is also required on the part of an operator who must pull the rope over a significant distance of up to 100 m as the rope is being unspooled from the rope drum. For this purpose, the rope is pressed against the ejector roller by means of the pressing device to achieve a corresponding transmission of force from the driven ejector roller to the rope and to achieve the desired rope tension on the rope.

In the operation of conventional forestry winches it is necessary to use a more powerful drive motor on the ejector roller to be able to achieve better rope tension with an increased rope tension during both the unspooling and the spooling of the rope.

SUMMARY OF THE INVENTION

The object of this invention is to make available a forestry winch of the type described above, with which an increased rope tension on the rope can be achieved in a simple manner by means of the drive motor of the ejector during the unspooling and spooling of the rope.

The invention accomplishes this object in that the pressing device has at least three pressing elements which are distributed around the circumference (periphery) on the ejector roller.

The invention is, therefore, based on the idea that for the use of a more powerful drive motor of the ejector roller, a better and increased rope tension as the rope is being spooled and unspooled requires a better transmission of force from the ejector roller driven by means of the drive motor to the rope. With at least three pressing elements that are distributed around the periphery of the ejector roller, an improvement and increase of the wrapping of the cable on the ejector roller can be achieved with little construction effort and expense and, therefore, in a simple manner, which makes it possible to transmit high forces from the ejector roller driven by means of the drive motor to the rope, so that a more powerful drive motor can be used on the ejector roller, with which an increased tension can be achieved on the rope during both spooling and unspooling of the rope.

According to one advantageous embodiment of the invention, the pressing elements are each in the form of rotatable pinch rollers which are biased toward the ejector roller by means of respective biasing elements. With corresponding pinch rollers, an improved and increased wrapping of the rope on the ejector roller can be achieved in a simple manner.

According to one advantageous embodiment of the invention, each biasing element is in the form of a spring element. With a spring element, the corresponding pinch roller and thus the rope can be pressed against the ejector roller in a simple manner, so that the at least three pinch rollers achieve an improved and increased wrapping of the rope on the ejector roller.

According to one advantageous embodiment of the invention, a first pressing element is oriented in a vertical plane and a second pressing element is oriented in a plane that is inclined in the wrapping direction of the rope on the ejector roller at an angle in the range of 10°-45°, preferably in the range of 30°-45°, with respect to the vertical plane.

According to one advantageous embodiment of the invention, in addition, a third pressing element is oriented in a plane that is inclined in the wrapping direction of the rope on the ejector roller at an angle in the range of 45°-90°, preferably in the range of 60°-90°, with respect to the vertical plane.

With three pressing elements arranged in the manner described above, a wrapping of the rope on the ejector roller at a wrapping angle of up to 90° can be achieved, which makes it possible to apply an increased tension to the rope with the drive motor of the ejector roller.

According to one advantageous embodiment of the invention, the ejector roller and the three pressing elements in the form of rotating pinch rollers are rotatably installed on a common bearing block. A common bearing block requires little construction effort and expense for the mounting of the rotatable ejector roller and the rotatable mounting of the spring-biased pinch rollers.

According to one advantageous embodiment of the invention, the bearing block is provided with an adjustment device for the adjustment of the bias of the biasing elements. As a result, the bias of the biasing elements, which can be in the form of spring elements, for example, and thus the pressing of the rope against the ejector roller can be modified and adjusted by means of the corresponding pinch roller in a simple manner and with easy accessibility.

BRIEF DESCRIPTION OF THE DRAWINGS

Additional advantages and details of the invention are described in greater detail below with reference to the exemplary embodiment illustrated in the accompanying schematic figures, in which.

DESCRIPTION OF THE INVENTION

Figure 1:
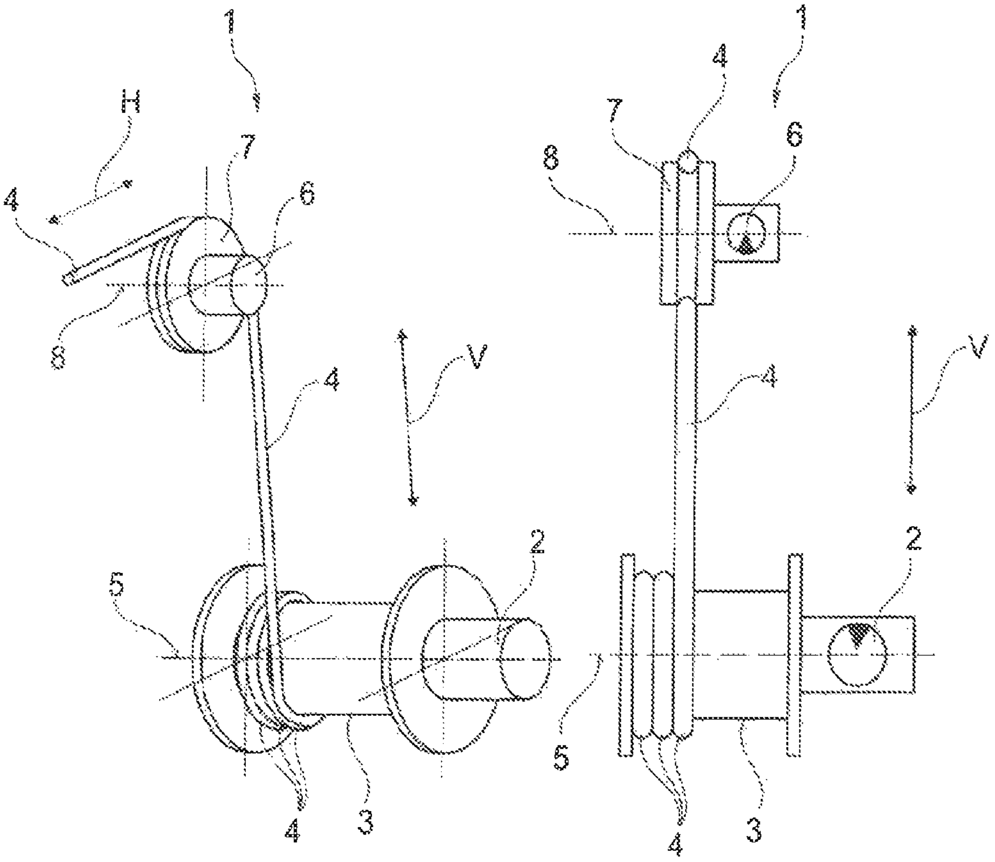
FIG. 1 is a schematic illustration of a forestry winch according to the invention.
Figure 2:
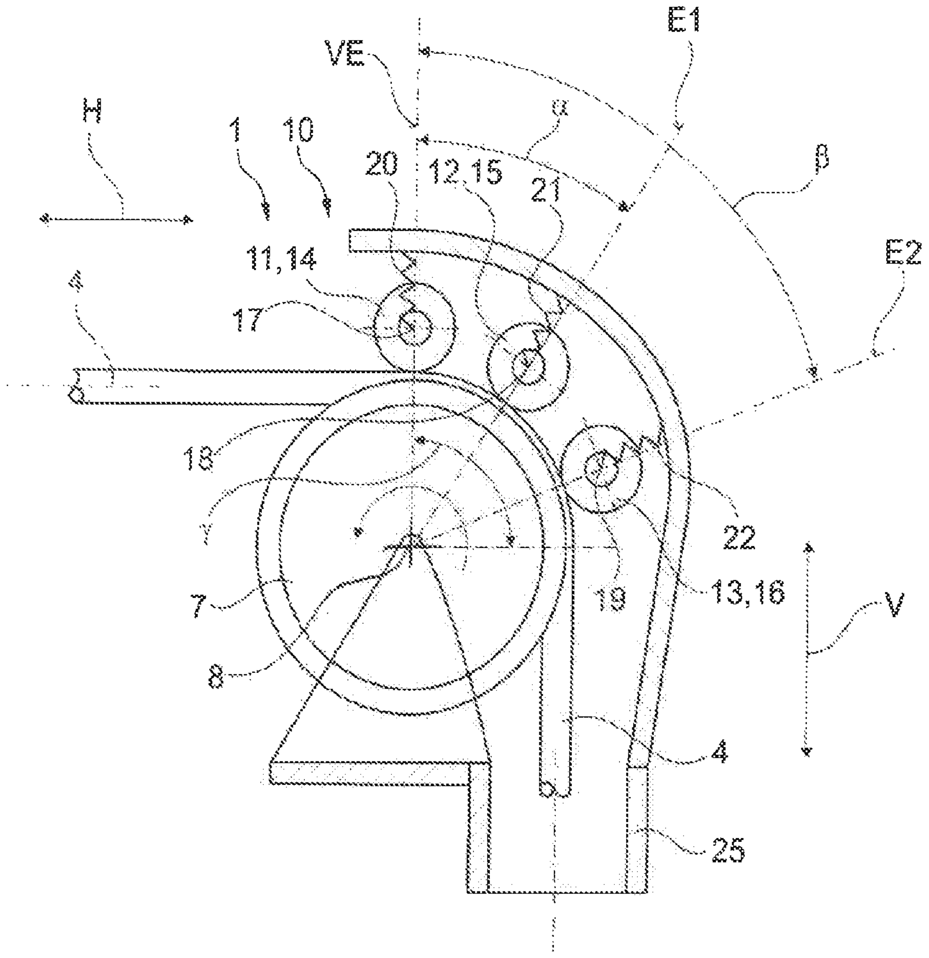
FIG. 2 shows the ejector roller in FIG. 1 in an enlarged schematic illustration.

FIG. 1 is a schematic illustration of a forestry winch 1 according to the invention. The illustration on the left in FIG. 1 shows a view in perspective and the illustration on the right shows a head-on view of the forestry winch 1 according to the invention.

The forestry winch 1 has a rope drum 3 which is driven by a drive motor 2 and on which a rope 4, for example a steel rope, is spooled. The rope drum 3 can rotate around an axis of rotation 5 and is driven by the drive motor 2. The drive motor 2 can be a hydraulic motor, for example.

The forestry winch 1 also has an ejector roller 7 driven by an additional drive motor 6. The ejector roller 7 can rotate around an axis of rotation 8 and is driven by the drive motor 6. The drive motor 6 can be a hydraulic motor, for example.

The rope 4 is guided from the rope drum 3 in the vertical direction V to the ejector roller 7, guided over the ejector roller 7 and deflected on the ejector roller 7 so that the rope 4 is guided away from the ejector roller 7 in the horizontal direction H.

The rope 4 is pressed on the ejector roller 7 by means of a pressing device 10, which is not illustrated in any further detail in FIG. 1 for the sake of simplicity.

FIGS. 2 to 5 show the ejector roller 7 from FIG. 1 with the pressing device 10 in a side view.

The pressing device 10 has at least three pressing elements 11, 12, 13 which are distributed around the periphery of the ejector roller 7.

The pressing elements 11, 12, 13 are each in the form of rotatable pinch rollers 14, 15, 16. The pinch roller 14 is arranged so that can rotate around an axis of rotation 17, the pinch roller 15 around an axis of rotation 18 and the pinch roller 16 around an axis of rotation 19. In the illustrated exemplary embodiment, the axes of rotation 17, 18, 19 of the respective pinch rollers 14, 15, 16 are oriented parallel to the axis of rotation 8 of the ejector roller 7. Each pinch roller 14, 15, 16 is biased toward the ejector roller 7 by means of a respective biasing element 20, 21, 22. In the illustrated exemplary embodiment, the biasing elements 20, 21, 22 are each in the form of a spring element, for example compression springs.

The first pressing element 11 and therefore the first pinch roller 14 is oriented in a vertical plane VE. The axis of rotation 8 of the ejector roller 7 and the axis of rotation 17 of the first pinch roller 14 are oriented in the vertical plane VE. The second pressing element 12 and, therefore, the second pinch roller 15 is oriented in the wrapping direction of the rope 4 on the ejector roller 7 in a first plane E1 that is inclined at a first angle $\alpha$ with respect to the vertical plane VE. The axis of rotation 8 of the ejector roller 7 and the axis of rotation 18 of the second pinch roller 15 are oriented in the first plane E1. The angle $\alpha$ is in the range of 10°-45°, in the illustrated exemplary embodiment in the range of 30°-45°.

The third pressing element 13 and therefore the third pinch roller 16 is oriented in the wrapping direction of the rope 4 on the ejector roller 7 in a second plane E2 that is inclined at an angle $\beta$ with respect to the vertical plane VE. The axis of rotation 8 of the ejector roller 7 and the axis of rotation 19 of the third pinch roller 16 are oriented in the second plane E2. The second angle $\beta$ is in the range of 45°-90°, in the illustrated exemplary embodiment in the range of 60°-90°.

With the three pinch rollers 14, 15, 16 and the rope 4 guided in the vertical direction to the rope drum 3, the rope 4 can therefore be wrapped on the ejector roller 7 at a wrap angle $\gamma$ of up to 90°.

In the illustrated exemplary embodiment, the ejector roller 7 and the presser devices 11-13 in the form of rotatable pinch rollers 14-16 are located rotatably on a common bearing block 25.

Figure 3:
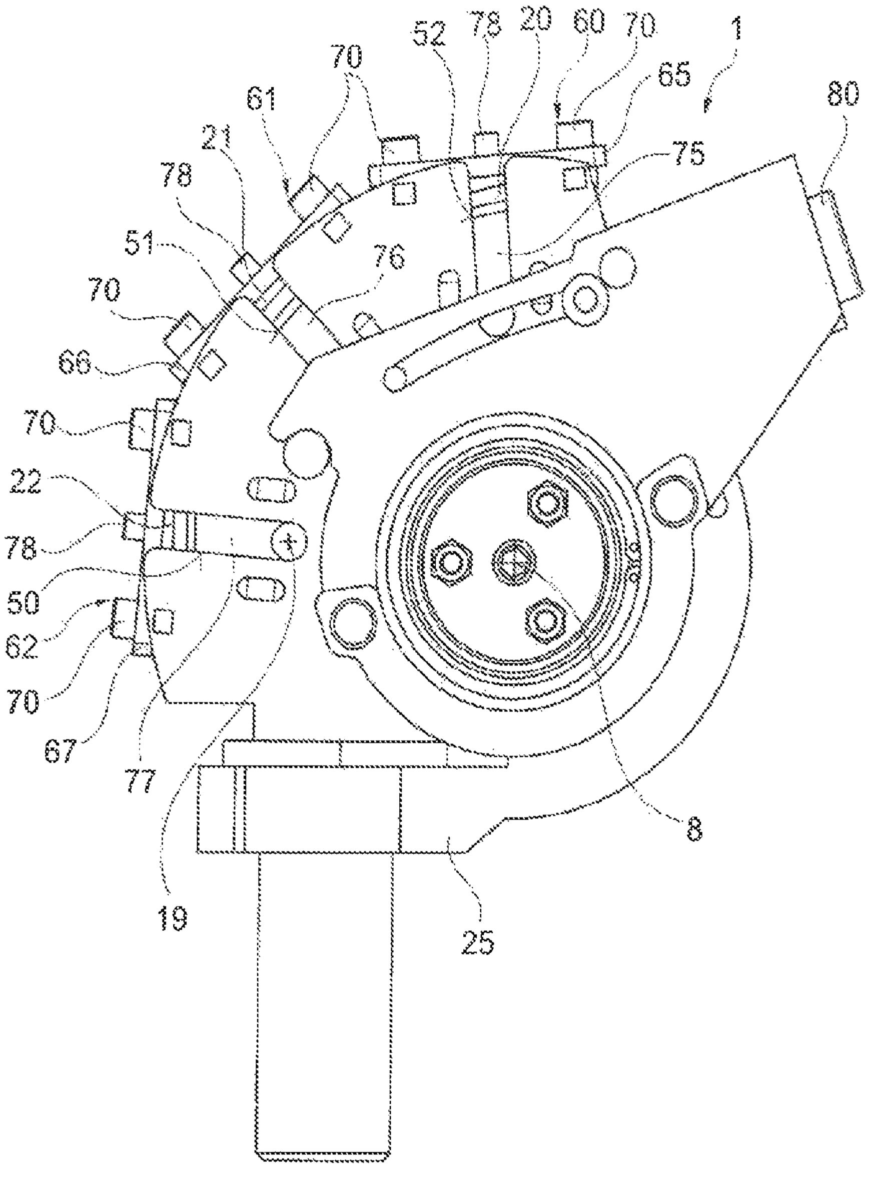
FIG. 3 shows the ejector roller in FIGS. 1 and 2 in a side view with the rope outlet pivoted upward.
Figure 4:
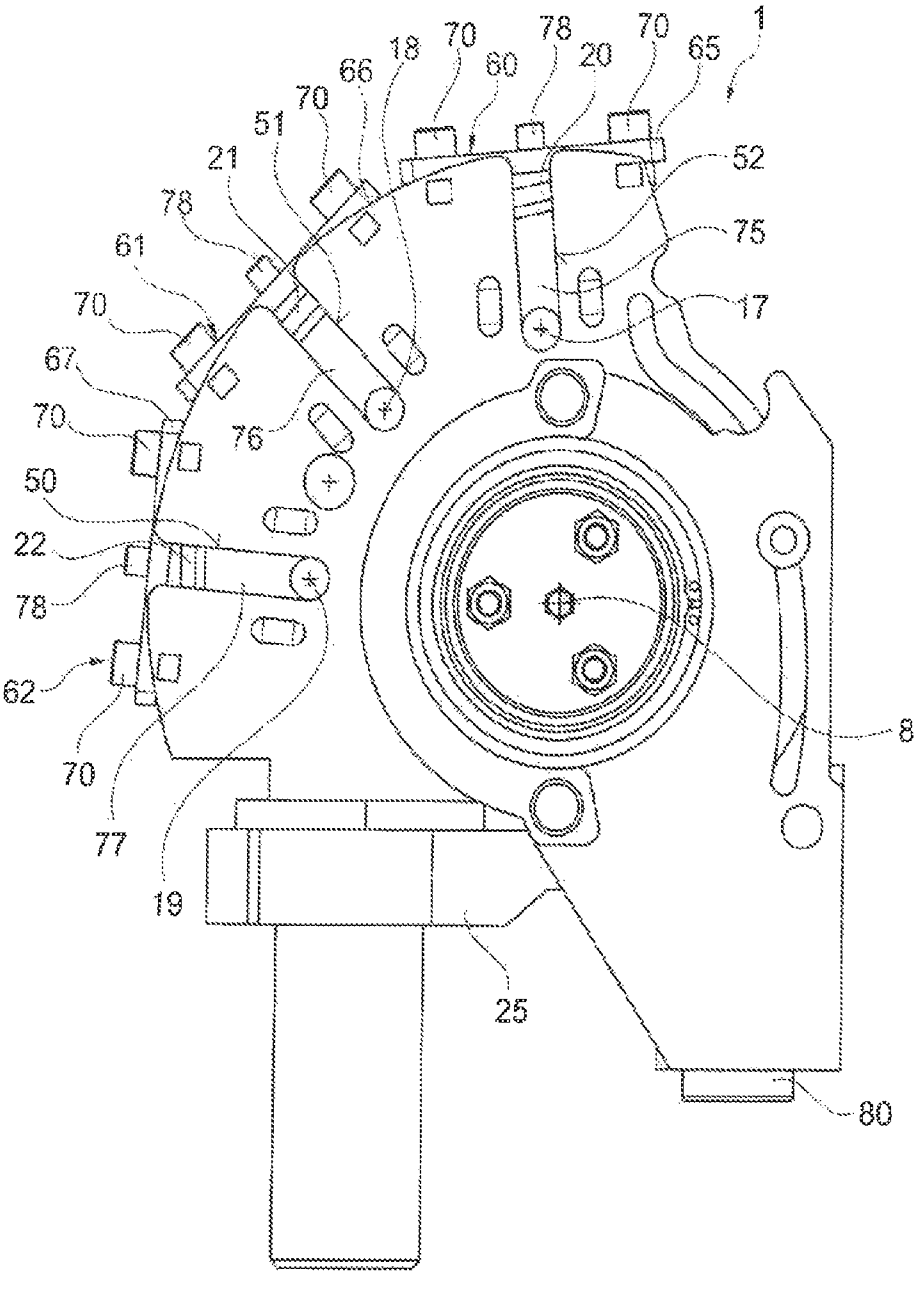
FIG. 4 shows the ejector roller in FIG. 3 in a view with the rope outlet pivoted downward.
Figure 5:
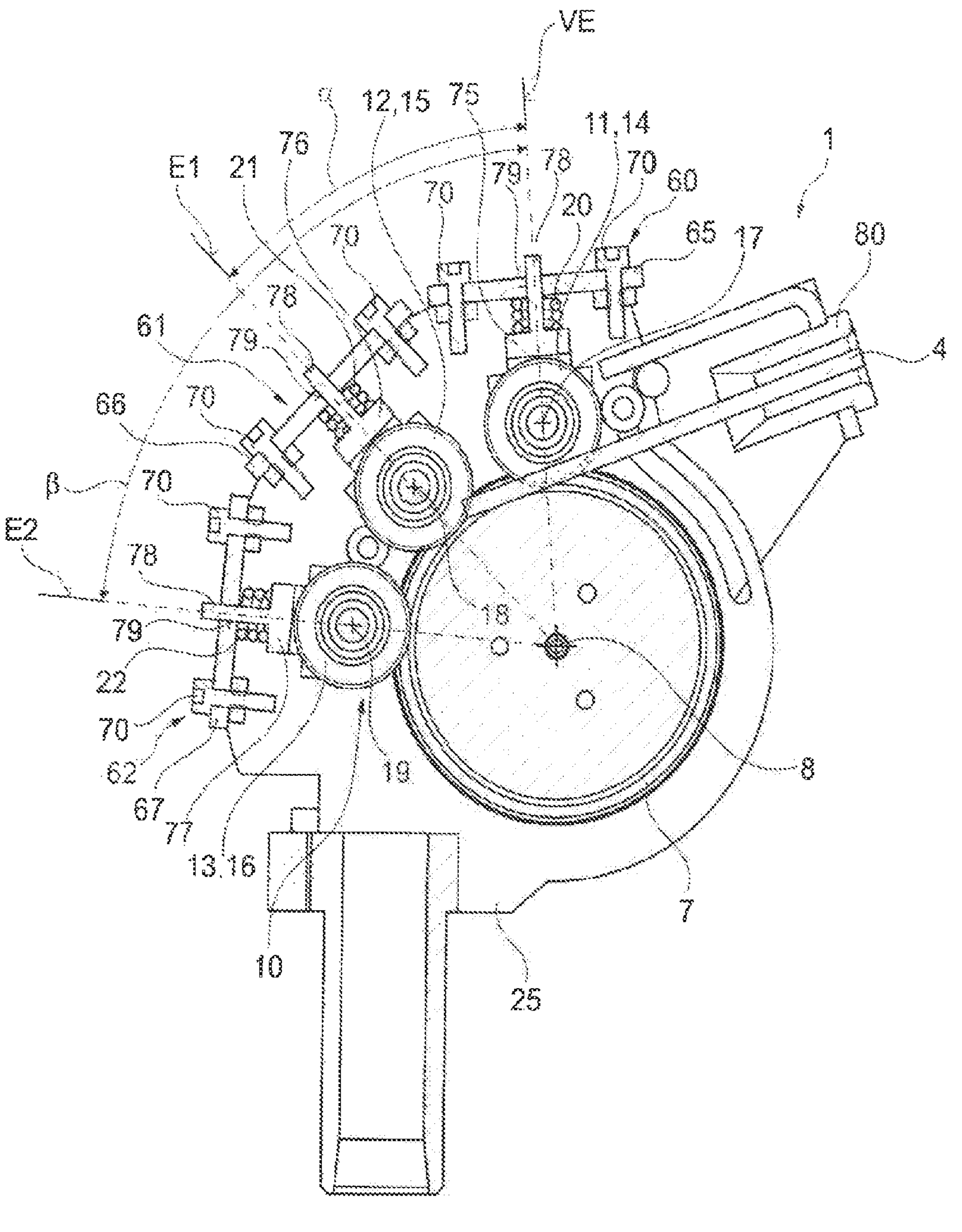
FIG. 5 is a sectional view of FIG. 3.

The pinch rollers 14-16 impinged by the spring elements 20-22 radially toward the ejector roller 7 can thereby be movably located with the axes of rotation 17-19—as shown in FIGS. 3 to 5—in corresponding slots 50, 51, 52 of the bearing block 25.

FIGS. 3 to 5 further show that the bias of the biasing elements 20, 21, 22 in the form of spring elements can each be adjusted by means of an adjustment device 60, 61, 62. Each adjustment device 60, 61, 62 has a stop plate 65, 66, 67 on which each of the biasing elements 20, 21, 22 in the form of spring elements is supported with one end. The stop plates 65, 66, 67 are each adjustably fastened to the bearing block 25 by means of adjustment screws 70 so that they can be adjusted radially with respect to the axis of rotation 8. With the second end, the biasing elements 20, 21, 22 in the form of spring elements are each supported on a hub bracket 75, 76, 77 that holds the axis of rotation 17, 18, 19. To secure the hub brackets 75, 76, 77 to prevent twisting around the corresponding axis of rotation 17, 18, 19, each hub bracket 75, 76, 77 is provided with a journal 78 which extends through a boring 79 in the stop plate 65, 66, 67. The journals 78 extend through the biasing elements 20, 21, 22, which are, preferably, in the form of compression springs.

FIGS. 3 to 5 also show a rope outlet 80 for the rope 4 guided over the ejector roller 7, whereby the outlet is located on the bearing block 25 so that it can pivot around the axis of rotation 8 of the ejector roller 7. In FIGS. 3 and 5, the rope outlet 80 is shown in position in which it is pivoted upward to its maximum extent. In FIG. 4, the rope outlet 80 is shown in position in which it is pivoted downward to its maximum extent.

With the pressing device 10 according to the invention, which consists of the three spring-biased pinch rollers 14, 15, 16 distributed around the periphery of the ejector roller 7, an improved wrapping of the rope 4 on the ejector roller 7 at a wrapping angle $\gamma$ of up to 90° can be achieved, which makes possible an improved transmission of force between the ejector roller 7 driven by the drive motor 6 and the rope 4, so that a higher-powered drive motor 6 can be used to drive the ejector roller 7, with which an increased rope tension can be applied to the segment of the rope 4 between the rope drum 3 and the ejector roller 7 for the secure and correct spooling of the rope 4 on the rope drum 3 and for the secure and correct spooling of the rope 4 from the cable drum 3.

The invention claimed is:

1. A forestry winch comprising:

a rope drum driven by a hydraulic drive motor; and an ejector roller driven by an additional hydraulic drive motor, wherein a rope is guided from the rope drum to the ejector roller and over the ejector roller, wherein the rope is pressed by a pressing device against the ejector roller, wherein the pressing device has at least three pressing elements, which are distributed around the periphery of the ejector roller, and wherein the at least three pressing elements are biased toward the ejector roller by at least three biasing elements, each of the at least three biasing elements corresponding to one of the at least three pressing elements.

2. The forestry winch according to claim 1, wherein the pressing elements are each in the form of rotatable pinch rollers.

3. The forestry winch according to claim 2, wherein each biasing element is in the form of a spring element.

4. The forestry winch according to claim 1, wherein a first pressing element is oriented in a vertical plane and a second pressing element is oriented in a first plane that is inclined in a wrapping direction of the rope on the ejector roller at a first angle (α) in the range of 10°-45° with respect to the vertical plane.

5. The forestry winch according to claim 4, wherein a third pressing element is oriented in a second plane that is inclined in the wrapping direction of the rope on the ejector roller at a second angle (β) in the range of 45°-90° with respect to the vertical plane.

6. The forestry winch according to claim 5, wherein the second angle (β) is in the range of 60°-90° with respect to the vertical plane.

7. The forestry winch according to claim 4, wherein the first angle (α) is in the range of 30°-45° with respect to the vertical plane.

8. The forestry winch according to claim 1, wherein the ejector roller and the pressing elements that are in the form of rotatable pinch rollers are rotatably installed on a common bearing block.

9. The forestry winch according to claim 8, wherein the bearing block is provided with an adjustment device for the adjustment of the bias of the respective biasing elements.

10. The forestry winch according to claim 1, wherein the adjustment device comprises at least three stop plates, wherein a first end of each of the at least three biasing elements is supported at an end of a corresponding one of the at least three stop plates, and wherein each of the at least three stop plates are configured to be radially adjusted, thereby adjusting the bias of the corresponding one of the at least three biasing elements.

11. The forestry winch according to claim 10, wherein a second end of each of the at least three biasing elements are supported on a corresponding hub bracket.

12. The forestry winch according to claim 11, wherein each of the corresponding hub brackets comprises a journal that extends through one of the corresponding at least three stop plates.

13. The forestry winch according to claim 12, wherein each of the at least three biasing elements are in the form of a compression spring that extends around the journal of the corresponding hub bracket.

14. The forestry winch according to claim 13, wherein the ejector roller and the at least three pressing elements are in the form of rotatable pinch rollers, and wherein the ejector roller, the at least three pressing elements, and the adjustment device are installed on a common bearing block.

15. The forestry winch according to claim 10, wherein each of the at least three stop plates are configured to be radially adjusted by at least one adjustment screw.

* * * * *